US008385055B2

(12) United States Patent
Kao et al.

(10) Patent No.: US 8,385,055 B2
(45) Date of Patent: Feb. 26, 2013

(54) ELECTRIC DEVICE AND DISPLAY PANEL THEREOF

(75) Inventors: Chi-Jen Kao, Taipei (TW); Yi-Kai Wang, Hsinchu (TW); Yu-Rung Peng, Taoyuan County (TW); Tsung-Hua Yang, Kaohsiung (TW); Tarng-Shiang Hu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1028 days.

(21) Appl. No.: 12/398,518

(22) Filed: Mar. 5, 2009

(65) Prior Publication Data

US 2010/0164837 A1 Jul. 1, 2010

Related U.S. Application Data

(60) Provisional application No. 61/140,896, filed on Dec. 26, 2008.

(51) Int. Cl.
*G06F 1/16* (2006.01)

(52) U.S. Cl. ......... 361/679.06; 361/679.04; 361/679.21; 361/679.3; 349/56; 349/58; 379/433.11; 379/433.12; 379/466.13

(58) Field of Classification Search ............... 361/679.06
See application file for complete search history.

(56) References Cited

U.S. PATENT DOCUMENTS

| | | | | |
|---|---|---|---|---|
| 5,559,670 A * | 9/1996 | Flint et al. | ................. | 361/679.06 |
| 6,016,176 A * | 1/2000 | Kim et al. | ...................... | 349/84 |
| 6,262,785 B1 * | 7/2001 | Kim | ................................ | 349/58 |
| 6,816,363 B2 * | 11/2004 | Yamamoto | ................. | 361/679.3 |
| D580,928 S | 11/2008 | Bemelmans et al. | | |
| 7,639,479 B2 * | 12/2009 | Chuang et al. | ........... | 361/679.06 |
| 7,714,801 B2 * | 5/2010 | Kimmel | ........................ | 345/1.3 |
| 8,120,899 B2 * | 2/2012 | Kim | ........................ | 361/679.28 |
| 8,229,522 B2 * | 7/2012 | Kim et al. | ................... | 455/575.3 |
| 2003/0189759 A1 * | 10/2003 | Kim et al. | ..................... | 359/619 |
| 2005/0040962 A1 * | 2/2005 | Funkhouser et al. | ...... | 340/815.4 |
| 2006/0209218 A1 * | 9/2006 | Lee et al. | .......................... | 349/1 |
| 2008/0144265 A1 * | 6/2008 | Aoki | ............................. | 361/681 |
| 2008/0204367 A1 | 8/2008 | Lafarre et al. | | |
| 2008/0211733 A1 | 9/2008 | Huitema | | |

FOREIGN PATENT DOCUMENTS

| | | |
|---|---|---|
| WO | 2008054203 | 5/2008 |
| WO | 2008054206 | 5/2008 |

OTHER PUBLICATIONS

International Symposium on Flexible Electronics and Displays Proceedings of Technical Program; Nov. 13-24, 2008; Industrial Technology Research Institute.

* cited by examiner

*Primary Examiner* — Anthony Q Edwards
(74) *Attorney, Agent, or Firm* — McClure, Qualey & Rodack, LLP (57) ABSTRACT

An electronic device and a display panel thereof are provided. The electronic device includes a first display panel and a casing. The first display panel has a first displaying part and a second displaying part. The first display panel includes a first bending mechanism which is disposed between the first displaying part and the second displaying part to bend or spread the first display panel. The casing has a first surface and a second surface opposite to the first surface. The casing includes a rail mechanism which is disposed on the second surface. The second displaying part is slid on the rail mechanism to shift the first display panel relatively to the casing.

33 Claims, 7 Drawing Sheets

ELECTRIC DEVICE AND DISPLAY PANEL THEREOF

This application claims the benefit of U.S. provisional application Ser. No. 61/140,896, filed Dec. 26, 2008, the subject matter of which is incorporated herein by reference.

BACKGROUND OF THE INVENTION

1. Field of the Invention

The invention relates in general to an electronic device and a display panel thereof, and more particularly to an electronic device adopting flat display technology and a display panel thereof.

2. Description of the Related Art

Along with the advance in technology, various electronic devices, which bring a large amount of convenience to modern people in their daily life, are continually provided. An electronic device normally displays the information or message on a display panel. Generally speaking, the larger the display panel, the more information can be displayed thereon, and the larger amount of convenience is provided to the user.

However, the display panel is normally disposed outside the casing of the electronic device. Such design makes the display panel greatly limited by the size of the casing. If the designer would like to increase the area of the display panel, the volume of the electronic device will inevitably be increased and the portability of the electronic device is deteriorated. If the electronic device maintains having a small volume, the area of the display panel cannot be increased. Thus, how to extend the display panel when the electronic device has a limited volume has become a focus of research and development to manufacturers.

SUMMARY OF THE INVENTION

The invention is directed to an electronic device and a display panel thereof. The design of having a bending mechanism and a sliding mechanism allows the electronic device to extend the display panel according to the needs.

According to a first aspect of the present invention, an electronic device is provided. The electronic device includes a first display panel and a casing. The first display panel has a first displaying part and a second displaying part. The first display panel includes a first bending mechanism which is disposed between the first displaying part and the second displaying part to bend or spread the first display panel. The casing has a first surface and a second surface opposite to the first surface. The casing includes a rail mechanism which is disposed on the second surface. The second displaying part is slid on the rail mechanism to shift the first display panel relatively to the casing.

According to a second aspect of the present invention, a display panel is provided. The display panel has a first displaying part and a second displaying part. The display panel is disposed inside a casing. The casing has a first surface and a second surface opposite to the first surface. The casing includes a rail mechanism which is disposed on the second surface. The display panel includes a bending mechanism which is disposed between the first displaying part and the second displaying part to bend or spread the first display panel. The second displaying part is slid on the rail mechanism to shift the first display panel relatively to the casing.

The invention will become apparent from the following detailed description of the preferred but non-limiting embodiments. The following description is made with reference to the accompanying drawings.

DETAILED DESCRIPTION OF THE INVENTION

The invention is exemplified by a number of embodiments disclosed below. However, the embodiments are for exemplification only, not for limiting the scope of protection of the invention. Also, secondary elements are omitted in the following embodiments to highlight the technical features of the invention.

First Embodiment

Figure 1:
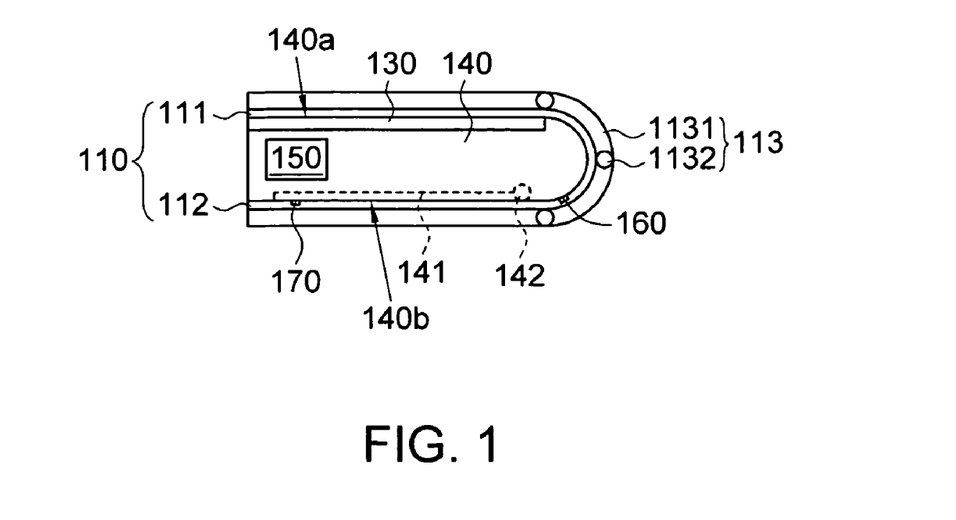
FIG. 1 shows an electronic device according to a first embodiment of the invention.

Referring to FIG. 1, an electronic device according to a first embodiment of the invention is shown. The electronic device 100 includes a display panel 110, a touch panel 130, a casing 140, a processing unit 150, a benditure detecting unit 160 and a shift detecting unit 170. The electronic device 100 is a notebook computer, a game station, a personal digital assistant (PDA), a mobile phone, an electronic book, an electronic reader, a global positioning system (GPS) receiver, a medical apparatus or a recording apparatus for example. In the present embodiment of the invention, the display panel 110 is a flexible display panel such as an organic light-emitting diode display (OLED display) or an electronic paper for example. The touch panel 130 is a liquid crystal display panel (LCD panel), an OLED display or an electronic paper for example. The processing unit 150 is for controlling the display panel 110 and the touch panel 130. The display panel 110 of the present embodiment of the invention can be bent and shifted relatively to the casing 140. The benditure detecting unit 160 is for detecting the benditure of the display panel 110. The shift detecting unit 170 is for detecting the shift of the display panel 110.

Furthermore, the display panel 110 has a first displaying part 111 and a second displaying part 112. The display panel 110 includes a bending mechanism 113. The bending mechanism 113 is disposed between the first displaying part 111 and the second displaying part 112. The casing 140 has a first surface 140a and a second surface 140b opposite to the first surface 140a. The casing 140 includes a rail mechanism 141 and a rotation mechanism 142. The rail mechanism 141 is disposed on the second surface 140b. The rotation mechanism 142 is connected to a terminal of the rail mechanism 141. For greater details, the operations of the bending mechanism 113, the rail mechanism 141 and the rotation mechanism 142 are further exemplified below by a number of movement diagrams.

Referring to FIG. 1, when the bending mechanism 113 bends the display panel 110, the first displaying part 111 covers the first surface 140a of the casing 140 and the second displaying part 112 covers the second surface 140b of the casing 140. Under such circumstances, the electronic device 100 has a smallest volume, and is very handy for a user in terms of portability.

Figure 2:
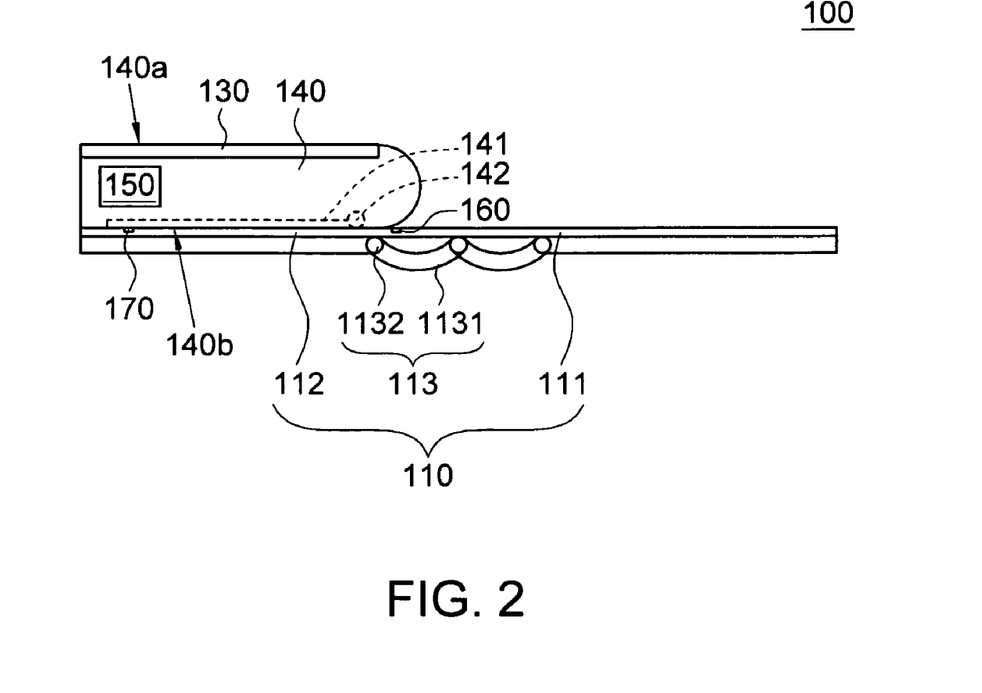
FIG. 2 shows a display panel of an electronic device being spread according to a first embodiment of the invention.

Referring to FIG. 2, the display panel 110 of the electronic device 100 being spread according to the first embodiment of the invention is shown. When the bending mechanism 113 spreads the display panel 110, the first displaying part 111 lifts the first surface 140a of the casing 140 but the second displaying part 112 still covers the second surface 140b of the casing 140. Under such circumstances, the first displaying part 111 of the display panel 110 is exposed outside the casing 140, and the electronic device 100 can display a frame through the first displaying part 111.

Again, referring to FIG. 2, the benditure detecting unit 160 of the present embodiment of the invention is disposed on the display panel 110 and is adjacent to the bending mechanism 113. The benditure detecting unit 160 is a ultra-red light sensor, a magnetic sensor or a mechanic button for example. When the display panel 110 is bent, the benditure detecting unit 160 is against on the casing 140, so the detection value of the benditure detecting unit 160 is detected as "1". When the display panel 110 is spread, the benditure detecting unit 160 lefts the casing, so the detection value of the benditure detecting unit 160 is detected as "0". Through the detection value of the benditure detecting unit 160, the processing unit 150 understands whether the display panel 110 is bent or spread. The processing unit 150 of the electronic device 100, according to the detection result of the benditure detecting unit 160, controls a display range of the display panel 110 to reach only the first displaying part 111 but not the second displaying part 112 so that a power for displaying the display frame will not be wasted.

Preferably, the processing unit 150 can further adjust the resolution of the to-be-displayed frame to obtain a better display effect according to the dimension of the first displaying part 111.

Figure 3:
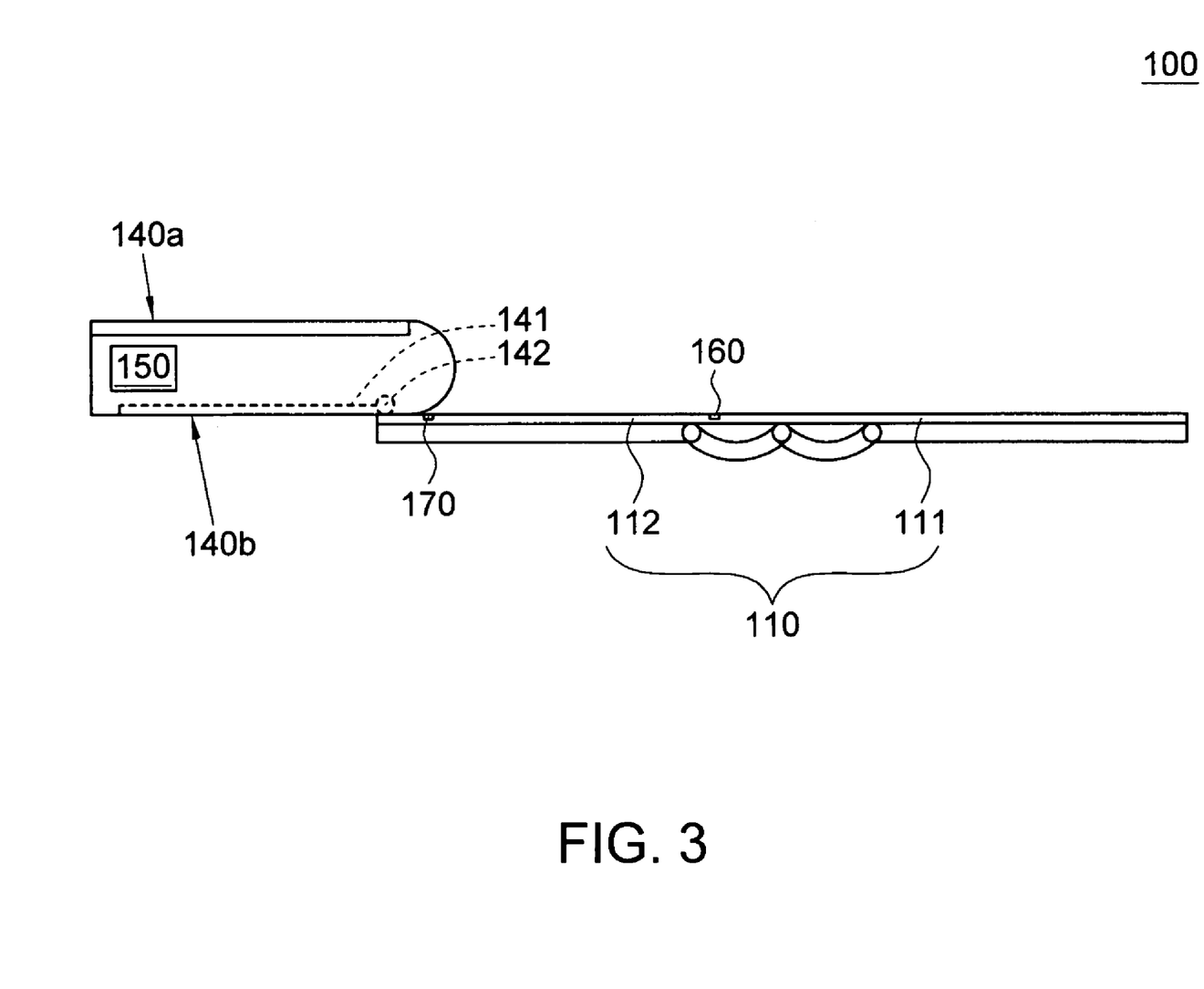
FIG. 3 shows a display panel of an electronic device being spread and extended according to a first embodiment of the invention.

Referring to FIG. 3, the display panel 110 of the electronic device 100 being spread and extended according to the first embodiment of the invention is shown. When the second displaying part 112 of the display panel 110 is extended outwards and shifted away from the casing 140 along the rail mechanism 141, the first displaying part 111 still lifts the first surface 140a of the casing 140 and the second displaying part 112 is extended outwards and shifted away from the second surface 140b of the casing 140. Under such circumstances, both the first displaying part 111 and the second displaying part 112 of the display panel 110 are exposed outside the casing 140, and the electronic device 100 can display a frame through the first displaying part 111 and the second displaying part 112 at the same time.

Again, referring to FIG. 3, the shift detecting unit 170 of the present embodiment of the invention is disposed on the display panel 110 and is adjacent to the second surface 140b of the casing 140. The shift detecting unit 170 is a ultra-red light sensor, a magnetic sensor or a mechanic button for example. When the display panel 110 is not extended, the shift detecting unit 170 is against the casing 140, so the detection value of the shift detecting unit 170 is detected as "1". When the display panel 110 is extended, the shift detecting unit 170 is shifted away from the casing 140, so the detection value of the shift detecting unit 170 is detected as "0". Through the vale detected by the shift detecting unit 170, the processing unit 150 understands that whether the display panel 110 is being extended. The processing unit 150 of 150 of electronic device 100, according the detection result of to the shift detecting unit 170, controls the display range of the display panel 110 to reach both the first displaying part 111 and the second displaying part 112 so as to obtain a largest display frame.

Figure 4:
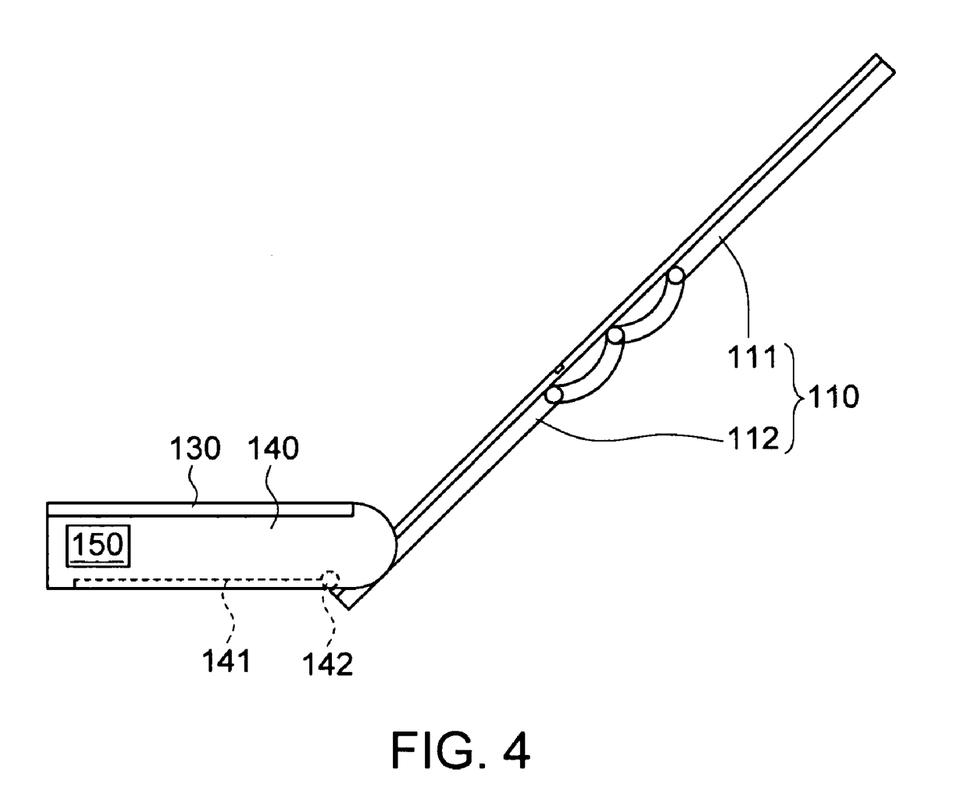
FIG. 4 shows a display panel of an electronic device being spread, extended and erected according to a first embodiment of the invention.

Referring to FIG. 4, the display panel 110 of the electronic device 100 being spread, extended and erected according to the first embodiment of the invention is shown. When the second displaying part 112 of the display panel 110 is slid to the terminal of the rail mechanism 141, the display panel 110, by means of the rotation mechanism 142, is turned over relatively to the casing 140 and is erected relatively to the casing 140. Under such circumstances, when the electronic device 100 is placed on a desk, the display panel 110 tilts to an angle with respect to the desktop, making the user more convenient in viewing the frame.

The processing unit 150 can further control a display frame of the touch panel 130 according to various states of the display panel 110. For example, the processing unit 150 can control the touch panel 130 to display a plurality of numeral keys or a plurality of alphabetical keys according to various states of the display panel 110.

The design of the bending mechanism 113 is indicated in FIG. 1. The bending mechanism 113 of the present embodiment of the invention includes two arc-shaped connecting elements 1131 and three rollers 1132. The rollers 1132 are disposed at the two ends of the arc-shaped connecting element 1131. The two outmost rollers 1132 are connected to the first displaying part 111 and the second displaying part 112 respectively. A cross section of each arc-shaped connecting element 1131 is substantially a quarter-circle arc, and the two arc-shaped connecting elements 1131 exactly constitute a semi-circle arc so that the first displaying part 111 and the second displaying part 112 can be bent to an angle of 0 degree or spread to an angle of 180 degrees by means of the bending mechanism 113.

Second Embodiment

Figure 5:
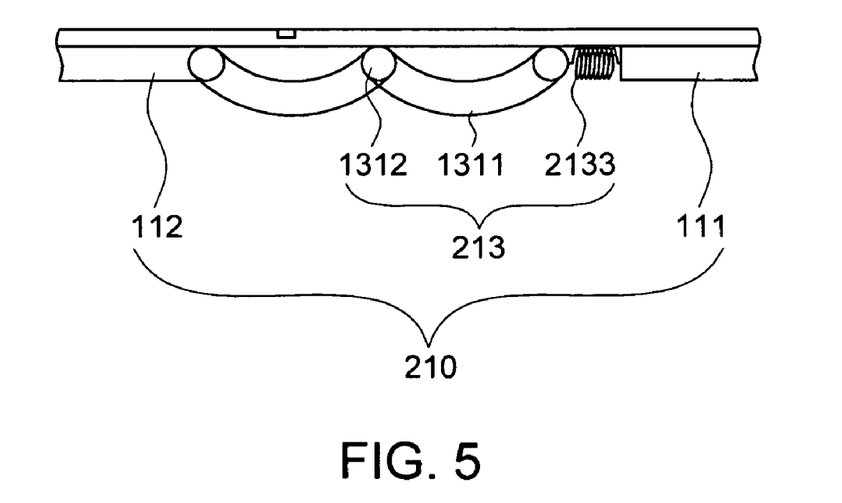
FIG. 5 shows an enlarged view of a bending mechanism according to a second embodiment of the invention.

Referring to FIG. 5, an enlarged view of a bending mechanism 213 according to a second embodiment of the invention is shown. The bending mechanism 213 of the present embodiment of the invention differs with the bending mechanism 113 of the first embodiment in that the bending mechanism 213 of the present embodiment of the invention further includes a retractable element 2133, and other similarities are not repeated here.

The retractable element 2133 is a retractable object such as spring, sponge or colloid. In the present embodiment of the invention, the retractable element 2133 is exemplified by a spring and is extended or contracted according to the state of benditure to avoid the bending mechanism 213 damaging the display panel 210 when being bent.

In terms of the location of the retractable element 2133, the retractable element 2133 is disposed between the first displaying part 111 and the second displaying part 112. For example, the retractable element 2133 can be disposed between the first displaying part 111 and the outmost roller 1132, between the arc-shaped connecting element 1131 and the roller 1132 or between the second displaying part 112 and the outmost roller 1132. In the present embodiment of the invention, the retractable element 2133 is disposed between the first displaying part 111 and the outmost roller 1132.

Third Embodiment

Figure 6:
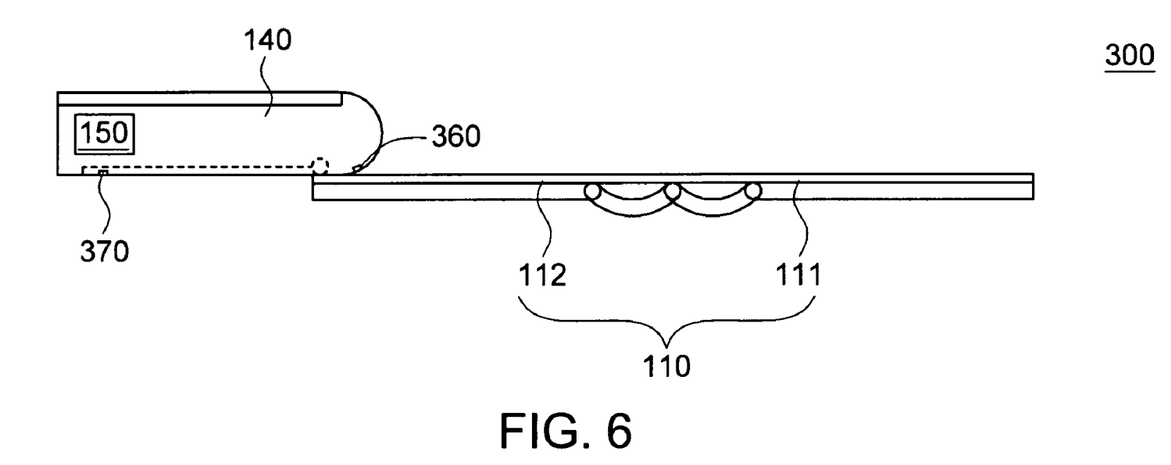
FIG. 6 shows a benditure detecting unit and a shift detecting unit according to a third embodiment of the invention.

Referring to FIG. 6, an electronic device 300 according to a third embodiment of the invention is shown. The electronic device 300 of the present embodiment of the invention differs with the electronic device 100 of the first embodiment in that both the benditure detecting unit 360 and the shift detecting unit 370 of the present embodiment of the invention are disposed on the casing 140, and other similarities are not repeated here.

In terms of the location of the benditure detecting unit 360 and the shift detecting unit 370, the benditure detecting unit 360 and the shift detecting unit 370 can also be disposed on the casing 140 in addition to being disposed on the display panel 110. When the display panel 110 is bent, the display panel 110 is against the benditure detecting unit 360, so the detection value of the benditure detecting unit 360 is detected as "1". When the display panel 110 is spread, the display panel 110 lefts the benditure detecting unit 360, so the detection value of the benditure detecting unit 360 is detected as "0". When the display panel 110 is not extended, the display panel 110 is against the shift detecting unit 370, so the detection value of the shift detecting unit 370 is detected as "1". When the display panel 110 is extended, the display panel 110 is shifted away from the shift detecting unit 370, so the detection value of the shift detecting unit 370 is detected as "0".

In other embodiments, the benditure detecting unit 360 is disposed on the display panel 110, and the shift detecting unit 370 is disposed on the casing 140. Or, in other embodiments, the benditure detecting unit 360 is disposed on the casing 140, and the shift detecting unit 370 is disposed on the display panel 110. Anyone who is skilled in the technology of the invention will understand that the location of the benditure detecting unit 360 and the shift detecting unit 370 is not for limiting the scope of protection of the invention.

Fourth Embodiment

Figure 7:
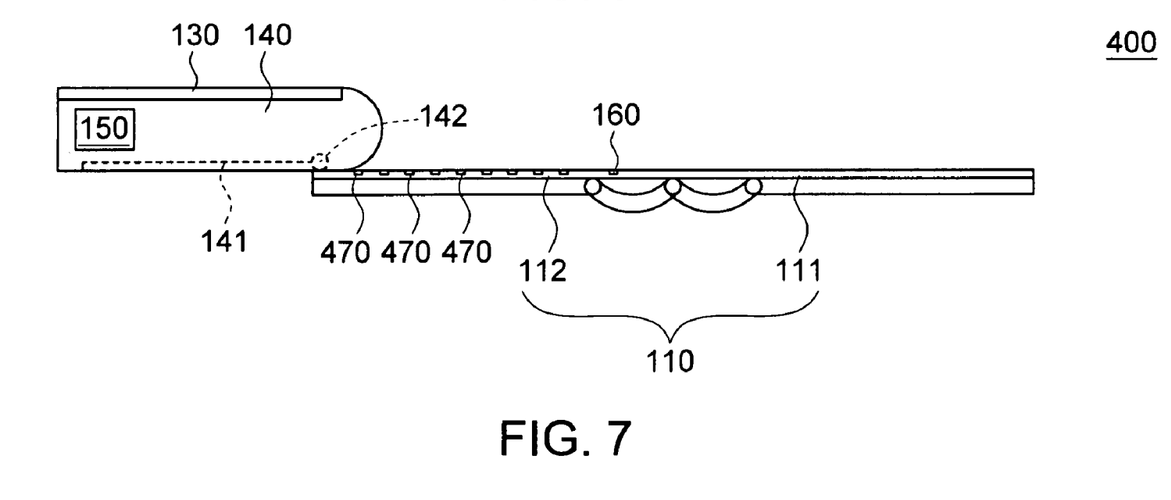
FIG. 7 shows a shift detecting unit according to a fourth embodiment of the invention.

Referring to FIG. 7, an electronic device 400 according to a fourth embodiment of the invention is shown. The electronic device 400 of present embodiment of the invention differs with the electronic device 100 of the first embodiment in that the shift detecting unit 470 of the present embodiment of the invention is constituted by a number of detectors, and other similarities are not repeated here.

As indicated in FIG. 7, the detectors of the shift detecting unit 470 are arranged along a shifting direction of the display panel 110. As the display panel 110 is gradually extended outwards, more and more detectors will be shifted away from the casing 140. Thus, through the detection values of the detectors, the level by which the display panel 110 is outwardly extended (such as being extended by 30%, 50%, or 90%) is obtained. The processing unit 150 can further control the display range of the display panel 110 according to the outward extension of the display panel 110.

Fifth Embodiment

Figure 8:
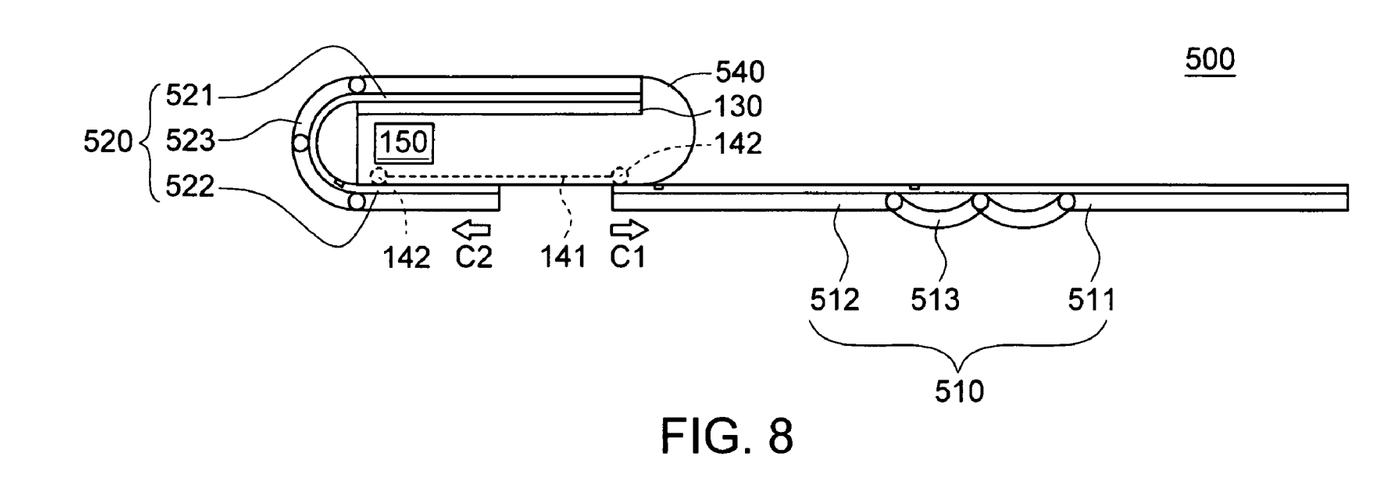
FIG. 8 shows an electronic device according to a fifth embodiment of the invention.

Referring to FIG. 8, an electronic device 500 according to a fifth embodiment of the invention is shown. The electronic device 500 of present embodiment of the invention differs with the electronic device 100 of the first embodiment in that the electronic device 500 of the present embodiment of the invention includes two sets of display panels (the first display panel 510 and the second display panel 520), and other similarities are not repeated here.

As indicated in FIG. 8, both the first display panel 510 and the second display panel 520 of the electronic device 500 are similar to the display panel 110 of the first embodiment. The first display panel 510 has a first displaying part 511 and a second displaying part 512. The second display panel 520 has a third displaying part 521 and a fourth displaying part 522. The first display panel 510 includes a first bending mechanism 513, and the second display panel 520 includes a second bending mechanism 523. The first display panel 510 and the second display panel 520 share a rail mechanism 141 of the casing 540. The first display panel 510 is shifted away from the casing 540 in a first direction C1, and the second display panel 520 is shifted away from the casing 140 in a second direction C2, wherein the first direction C1 and the second direction C2 are opposite to each other.

Thus, when the first display panel 510 and the second display panel 520 are spread by means of the first bending mechanism 513 and the second bending mechanism 523 respectively, both the first displaying part 511 and the third displaying part 521 are exposed outside the casing 140, and the electronic device 500 can display a frame through the first displaying part 511 and the third displaying part 521.

When the first display panel 510 and the second display panel 520 are further shifted outwards by means of the rail mechanism 141, the first displaying part 511, the second displaying part 512, the third displaying part 521 and the fourth displaying part 522 are all exposed outside the casing 140, and the electronic device 500 can display a frame through the first displaying part 511, the second displaying part 512, the third displaying part 521 and the fourth displaying part 522 at the same time.

Sixth Embodiment

Figure 9:
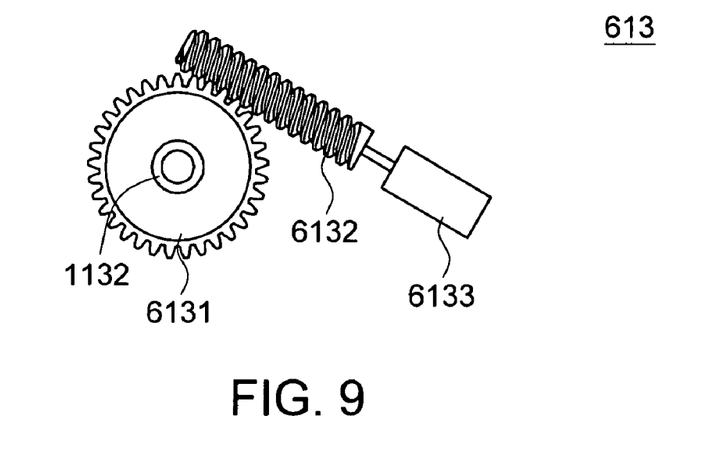
FIG. 9 shows a bending mechanism according to a sixth embodiment of the invention.

Referring to FIG. 9, a bending mechanism 613 according to a sixth embodiment of the invention is shown. The bending mechanism 613 of the present embodiment of the invention differs with the bending mechanism 113 of the first embodiment in that the bending mechanism 613 of the present embodiment of the invention further has a positioning design, and other similarities are not repeated here.

The bending mechanism 613 of the present embodiment of the invention further includes a gear 6131, a screw pillar 6132 and a motor 6133. The gear 6131 is connected to the roller 1132, the screw pillar 6132 is engaged with the gear 6131, and the motor 6133 is connected to the screw pillar 6132. When the motor 6133 drives the screw pillar 6132 to rotate, the screw pillar 6132 further drives the gear 6131 to rotate so as to bend the bending mechanism 613. When the motor 6133 does not drive the screw pillar 6132 to rotate, the screw pillar 6132 positions the gear 6131 and the roller 1132 so that the gear 6131 and the roller 1132 will not rotate, and the bending angle of the bending structure 613 is positioned accordingly.

Seventh Embodiment

Figure 10:
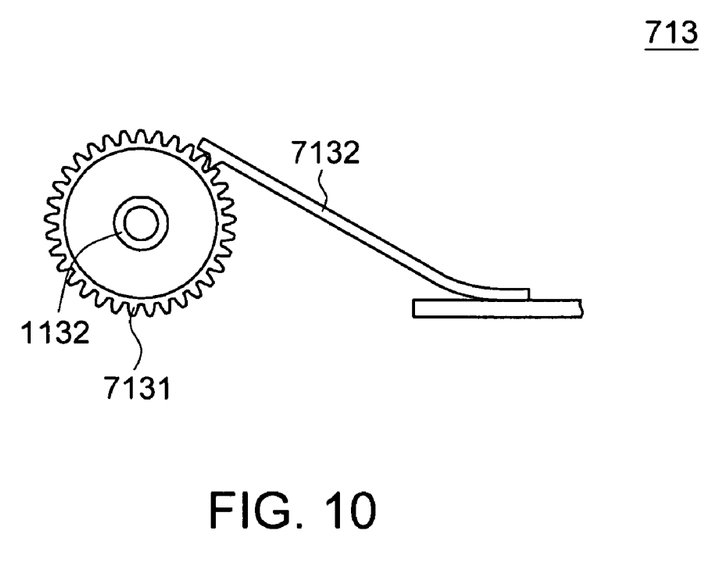
FIG. 10 shows a bending mechanism according to a seventh embodiment of the invention.

Referring to FIG. 10, a bending mechanism 713 according to a seventh embodiment of the invention is shown. The bending mechanism 713 of the present embodiment of the invention differs with the bending mechanism 113 of the first embodiment in that the bending mechanism 713 of the present embodiment of the invention further has a positioning design, and other similarities are not repeated here.

The bending mechanism 713 of the present embodiment of the invention further includes a plurality of bumps 7131 and elastic arms 7132. The bumps 7131 are disposed on the roller 1132. The elastic arms 7132 are against between two of the bumps 7131. As the roller 1132 is rotated, the elastic arms 7132 will be deformed and crossing over one of the bumps 7131 to be engaged between another two bumps 7131 so as to position the bending angle of the bending structure 713.

Eighth Embodiment

Figure 11:
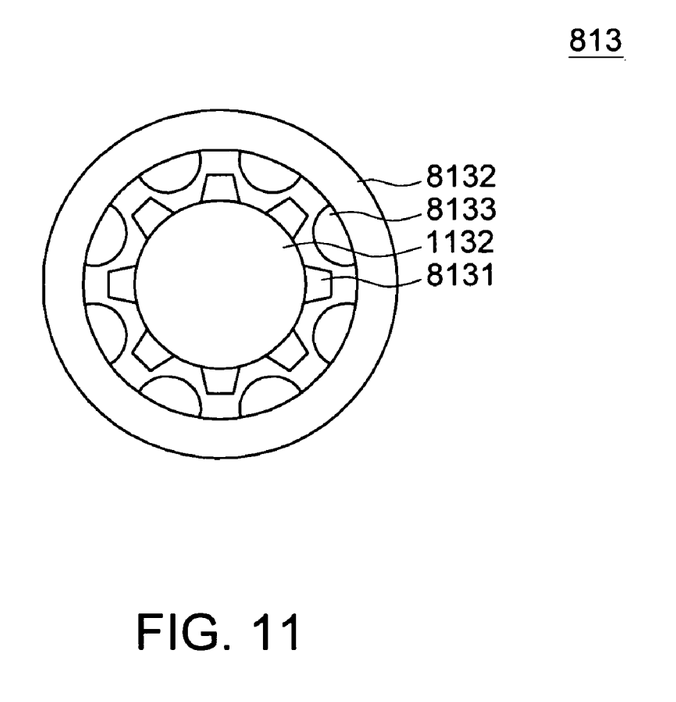
FIG. 11 shows a bending mechanism according to an eighth embodiment of the invention.

Referring to FIG. 11, a bending mechanism 813 according to an eighth embodiment of the invention is shown. The bending mechanism 813 of the present embodiment of the invention differs with the bending mechanism 113 of the first embodiment in that the bending mechanism 813 of the present embodiment of the invention further has a positioning design, and other similarities are not repeated here.

The bending mechanism 813 of the present embodiment of the invention further includes a number of hard bumps 8131, a ring element 8132 and a number of soft bumps 8133. The hard bumps 8131 are disposed on the roller 1132. The soft bumps 8133 are disposed inside the ring element 8132. Each soft bump 8133 is engaged between two of the hard bumps 8131. As the roller 1132 is rotated, the soft bumps 8133 will be deformed and crossing over one of the hard bumps 8131 to be engaged between another two hard bumps 8131 so as to position the bending angle of the bending structure 813.

Ninth Embodiment

Figure 12:
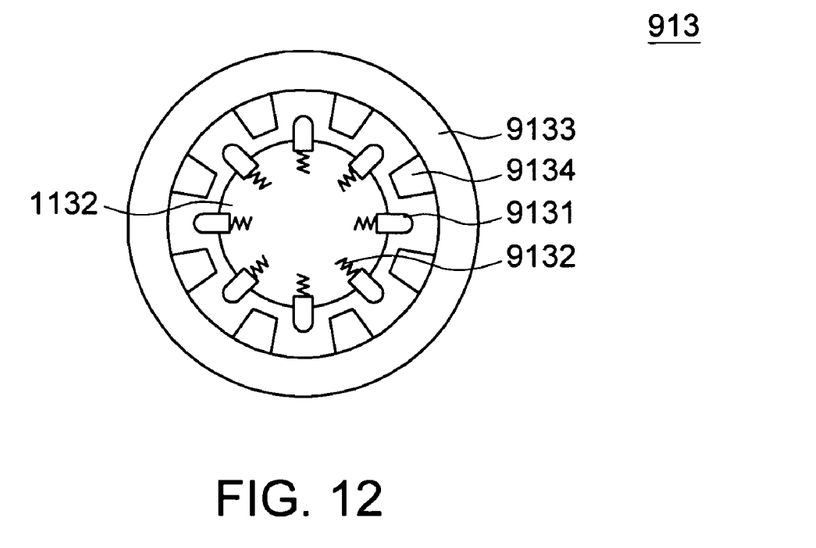
FIG. 12 shows a bending mechanism according to a ninth embodiment of the invention.

Referring to FIG. 12, a bending mechanism 913 according to a ninth embodiment of the invention is shown. The bending mechanism 913 of the present embodiment of the invention differs with the bending mechanism 113 of the first embodiment in that the bending mechanism 913 of the present embodiment of the invention further has a positioning design, and other similarities are not repeated here.

The bending mechanism 913 of the present embodiment of the invention includes a number of pins 9131, a number of elastic elements 9132, a ring element 9133 and a number of hard bumps 9134. The elastic elements 9132 are disposed inside the roller 1132, and are against the pins 9131 respectively. The hard bumps 9134 are disposed inside the ring element 9133. Each pin 9131 is engaged between two of the hard bumps 9134. As the roller 1132 is rotated, the elastic elements 9132 will be deformed and make the pins 9131 cross over one of the hard bumps 9134 to be engaged between another two hard bumps 9134 so as to position the bending angle of the bending structure 913.

Tenth Embodiment

Figure 13:
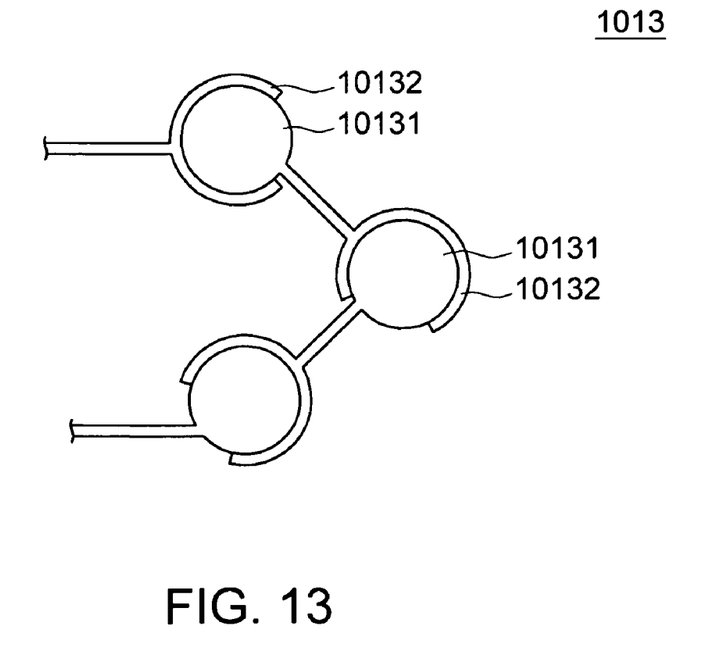
FIG. 13 shows a bending mechanism according to a tenth embodiment of the invention.

Referring to FIG. 13, a bending mechanism 1013 according to a tenth embodiment of the invention is shown. The present embodiment of the invention differs with the first embodiment in the design of the bending mechanism 1013, and other similarities are not repeated here.

The bending mechanism 1013 of the present embodiment of the invention includes a plurality of spherical bumps 10131 and mounting elements 10132. The mounting elements 10132 are movably mounted on the spherical bump 10131. The outer diameter of the spherical bump 10131 is slightly larger than the inner diameter of the mounting elements 10132, and the mounting elements 10132 have a certain level of elasticity, so that the mounting elements 10132 can be firmly mounted on the spherical bumps 10131 and can be rotated freely at the same time. Thus, the display panel 110 can be bent by the bending mechanism 1013 to be positioned at a particular bending angle.

According to the electronic device and the display panel thereof disclosed in the above embodiments of the invention, the design of having a bending mechanism and a sliding mechanism provides the electronic device and the display panel thereof with many advantages as follows.

Firstly, when the bending mechanism bends the display panel, the first displaying part covers the first surface of the casing and the second displaying part covers the second surface of the casing. Under such circumstances, the electronic device has the smallest volume and is very handy to the user in terms of portability.

Secondly, when the bending mechanism spreads the display panel, the first displaying part lifts the first surface of the casing but the second displaying part still covers the second surface of the casing. Under such circumstances, the first displaying part of the display panel is exposed outside the casing, and the electronic device can display a frame through the first displaying part display frame.

Thirdly, the processing unit can further adjust the resolution of the to-be-displayed frame to obtain a better display effect according to how much the display panel is exposed outside the casing.

Fourthly, when the second displaying part of the display panel is extended outwards and shifted away from the casing along the rail mechanism, the first displaying part still lifts the first surface of the casing but the second displaying part is already off the second surface of the casing. Under such circumstances, both the first displaying part and the second displaying part of the display panel are exposed outside the casing, and the electronic device can display a frame through the first displaying part and the second displaying part at the same time so as to obtain a largest display frame.

Fifthly, when the second displaying part of the display panel is slid to the terminal of the rail mechanism, the display panel, by means of the rotation mechanism, is turned over relatively to the casing and is erected relatively to the casing. Under such circumstances, when the electronic device is placed on a desk, the display panel tilts an angle with respect to the desktop, making the user more convenient in viewing the frame.

Sixth, the processing unit can control the display frame of the touch panel according to the different states of the display panel.

Seventhly, the cross section of each arc-shaped connecting element is substantially a quarter-circle arc, so that the first displaying part and the second displaying part can be bent to an angle of 0 degree or spread to an angle of 180 degrees by means of the bending mechanism.

Eighthly, the retractable element can extend or contract according to the level of benditure to avoid the bending mechanism damaging the display panel when being bent.

Ninthly, the processing unit can control the display range of the display panel according to the outward extension of the display panel.

Tenthly, in the embodiment in which the electronic device includes two sets of display panel, when the first display panel and the second display panel are shifted outwards by means of a rail mechanism, the electronic device can display a frame through the first displaying part, the second displaying part, the third displaying part and the fourth displaying part at the same time.

Eleventhly, the bending mechanism can position the bending angle by means of various positioning designs.

Twelvethly, in an embodiment, the bending mechanism can be movably mounted on a spherical bump by means of a mounting element, so that the mounting elements can be firmly mounted on the spherical bump and rotated freely so as to position the display panel at a particular bending angle.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
    a first display panel having a first displaying part and a second displaying part, wherein the first display panel comprises:
    a first bending mechanism disposed between the first displaying part and the second displaying part to bend or spread the first display panel; and
    a casing having a first surface and a second surface opposite to the first surface, wherein the casing comprises:
    a rail mechanism disposed on the second surface, wherein the second displaying part is slid on the rail mechanism to shift the first display panel relatively to the casing; and
    a processing unit for controlling a display range of the first display panel according to a range to which the first display panel is shifted outside the casing.

2. The electronic device according to claim 1, wherein the first display panel is a flexible display panel.

3. The electronic device according to claim 1, wherein the casing further comprises:
    a rotation mechanism connected to the terminal of the rail mechanism to turn over the first display panel relatively to the casing.

4. The electronic device according to claim 1, further comprising:
    a benditure detecting unit for detecting a benditure of the first display plane.

5. The electronic device according to claim 4, wherein the benditure detecting unit is disposed on the casing.

6. The electronic device according to claim 4, wherein the benditure detecting unit is disposed on the first display panel.

7. The electronic device according to claim 1, further comprising:
    a shift detecting unit for detecting the shift of the first display panel.

8. The electronic device according to claim 7, wherein the shift detecting unit is disposed on the casing.

9. The electronic device according to claim 7, wherein the shift detecting unit is disposed on the first display panel.

10. The electronic device according to claim 7, wherein the shift detecting unit merely comprises one detector.

11. The electronic device according to claim 7, wherein the shift detecting unit comprises a plurality of detectors arranged along a shifting direction of the first display panel.

12. The electronic device according to claim 1, further comprising:
    a second display panel having a third displaying part and a fourth displaying part, wherein the second display panel comprises:
    a second bending mechanism disposed between the third displaying part and the fourth displaying part to bend or spread the second display panel;
    wherein, the fourth displaying part is slid on the rail mechanism to shift the second display panel relatively to the casing.

13. The electronic device according to claim 12, wherein the first display panel and the second display panel are shifted away from the casing in two opposite directions.

14. The electronic device according to claim 1, further comprising:
    a touch panel disposed on the first surface of the casing.

15. The electronic device according to claim 14, wherein the touch panel is for displaying a plurality of keys.

16. The electronic device according to claim 14,
    wherein the processing unit is further for controlling a display frame of the touch panel according to a range to which the first display panel is shifted outside the casing.

17. The electronic device according to claim 1, wherein the first bending mechanism comprises:
    at least one arc-shaped connecting element; and
    at least two rollers disposed at the two ends of the arc-shaped connecting element.

18. The electronic device according to claim 17, wherein the first bending mechanism comprises two arc-shaped connecting elements and a cross section of each arc-shaped connecting element is substantially a quarter-circle arc.

19. The electronic device according to claim 17, wherein the first bending mechanism further comprises:
    a gear;
    a screw pillar engaged with the gear; and
    a motor for driving the screw pillar to rotate.

20. The electronic device according to claim 17, wherein the first bending mechanism further comprises:
    a plurality of bumps disposed on one of the rollers; and
    an elastic arms being against between two of the bumps.

21. The electronic device according to claim 17, wherein the first bending mechanism further comprises:
    a plurality of hard bumps disposed on one of the rollers;
    a ring element; and
    a plurality of soft bumps disposed inside the ring element, and each soft bump is engaged between two of the hard bumps.

22. The electronic device according to claim 17, wherein the first bending mechanism further comprises:
    a plurality of pins;
    a plurality of elastic elements disposed inside one of the rollers, wherein the elastic elements are respectively against the pins;
    a ring element; and
    a plurality of hard bumps disposed inside the ring element, wherein each pin is engaged between two of the hard bumps.

23. The electronic device according to claim 1, wherein the first bending mechanism comprises:
    a spherical bump; and
    a mounting element movably mounted on the spherical bump.

24. The electronic device according to claim 1, wherein the first bending mechanism comprises:
    a retractable element disposed between the first displaying part and the second displaying part to extend or contract the first bending mechanism according to the benditure.

25. A display panel having a first displaying part and a second displaying part, wherein the display panel is disposed inside a casing, the casing has a first surface and a second surface opposite to the first surface, the casing comprises a rail mechanism disposed on the second surface, and the display panel comprises:

a bending mechanism disposed between the first displaying part and the second displaying part to bend or spread the display panel, wherein the second displaying part is slid on the rail mechanism to shift the display panel relatively to the casing, and a display range of the first display panel is controlled according to a range to which the first display panel is shifted outside the casing.

26. The display panel according to claim 25, wherein the bending mechanism comprises:
   at least one arc-shaped connecting element; and
   at least two rollers disposed at the two ends of the arc-shaped connecting element.

27. The display panel according to claim 26, wherein the bending mechanism comprises two arc-shaped connecting elements, and a cross section of each arc-shaped connecting element is substantially a quarter-circle arc.

28. The display panel according to claim 26, wherein the bending mechanism further comprises:
   a gear;
   a screw pillar engaged with the gear; and
   a motor for driving the screw pillar to rotate.

29. The display panel according to claim 26, wherein the bending mechanism further comprises:
   a plurality of bumps disposed on one of the rollers; and
   an elastic arms being against between two of the bumps.

30. The display panel according to claim 26, wherein the bending mechanism further comprises:
   a plurality of hard bumps disposed on one of the rollers;
   a ring element; and
   a plurality of soft bumps disposed inside the ring element, wherein each soft bump is engaged between two of the hard bumps.

31. The display panel according to claim 26, wherein the bending mechanism further comprises:
   a plurality of pins;
   a plurality of elastic elements disposed inside one of the rollers, wherein the elastic elements respectively are against the pins;
   a ring element; and
   a plurality of hard bumps disposed inside the ring element, wherein each pin is engaged between two of the hard bumps.

32. The display panel according to claim 25, wherein the bending mechanism comprises:
   a spherical bump; and
   a mounting element movably mounted on the spherical bump.

33. The display panel according to claim 25, wherein the bending mechanism comprises:
   a retractable element disposed between the first displaying part and the second displaying part to extend or contract the bending mechanism according to the benditure.

* * * * *